United States Patent Office 3,808,196
Patented Apr. 30, 1974

3,808,196
GLYCOSYL PANTOTHENIC ACIDS
Hajime Yoshizumi, Tondabayashi, Teruo Amachi, Takarazuka, Shoji Imamoto, Kishiwada, and Siro Senoh, Nishinomiya, Japan, assignors to Suntory Limited, Osaka-shi, Japan
No Drawing. Filed Oct. 22, 1971, Ser. No. 191,851
Claims priority, application Japan, Oct. 22, 1970, 45/93,332, 45/93,333
Int. Cl. C07c 47/18
U.S. Cl. 260—210 R
4 Claims

ABSTRACT OF THE DISCLOSURE

A glycosyl pantothenic acid having a formula of

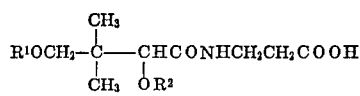

wherein one of $R^1$ and $R^2$ is hydrogen and the other is β-ribofuranosyl, β-D-glucopyranosyl, β-D-galactopyranosyl, β-cellobiosyl or β-maltosyl: This compound has higher physiological activity than that of calcium D-pantothenic acid.

---

This invention relates to novel glycosyl pantothenic acids and to a process for manufacturing the same.

The glycosyl pantothenic acids of the present invention are represented by the formula of

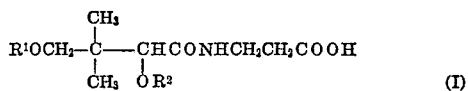
(I)

wherein one of $R^1$ and $R^2$ is hydrogen and the other is β - D - ribofuranosyl, β-D-glucopyranosyl, β-D-galactopyranosyl, β-cellobiosyl or β-maltosyl. The present compounds are novel and include two types of compounds, i.e., 2'-O-(β-glycosyl)-D-pantothenic acids having the following Formula I-A and 4'-O-(β-glycosyl)-O-pantothenic acid having the Formula I-B.

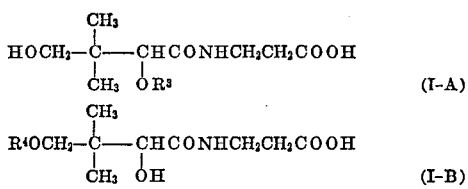

wherein $R^3$ and $R^4$ are β-D-ribofuranosyl, β-D-glucopyranosyl, β-D-galactopyranosyl, β-cellobiosyl or β-maltosyl.

Both types of compounds are hygroscopic powder and soluble in water, methanol, ethanol, pyridine, etc., but insoluble in benzene, ethyl ether, chloroform, etc.

The present compounds are derivatives of D-pantothenic acid and have physiological activity like D-pantothenic acid. For example, they display adjusting effect on metabolism in microorganisms. The physiological activity of the present compounds is superior to that of calcium D-pantothenate. For instance, they display several times to one hundred times the activity of calcium D-pantothenate on strains belonging to the genus lactobacillaceae. Furthermore, the present compounds are more excellent in alkali-resistant, acid-resistant and heat-resistant properties as compared with D-pantothenic acid. Accordingly the present compounds are useful for various applications as medicines, cosmetic, food additives, additives for feeds, as medicines, cosmetics, food additives, additives for feeds, additives for culture medium for microorganisms, etc.

2'-O-(β-D-glucopyranosyl)-D-pantothenic acid,
2'-O-(β-cellobiosyl)-D-pantothenic acid,
4'-O-(β-D-glucopyranosyl)-D-pantothenic acid,
4'-O-(β-D-ribofuranosyl)-D-pantothenic acid,
4'-O-(β-D-galactopyranosyl)-D-pantothenic acid,
4'-O-(β-cellobiosyl)-D-pantothenic acid and
4'-O-(β-maltosyl)-D-pantothenic acid.

Of these compounds, 4'-O-(β-D-glucopyranosyl)-D-pantothenic acid is the most preferable, because it displays higher order of physiological activities for some microorganisms.

To clarify the physiological activities of the present compounds the following tests were performed.

(I) PHYSIOLOGICAL ACTIVITY ON LACTOBACILLACEAE

Test A.—Activity of 4' - O - (β - D-glucopyranosyl)-D-pantothenic acid on WNB–75 strain A–1. Basal medium (double strength)—

| | Wt./v. percent |
|---|---|
| D-glucose | 1.0 |
| D-fructose | 1.0 |
| Yeast extract | 1.0 |
| Polypeptone | 1.0 |
| $KH_2PO_4$ | 0.1 |
| NaCl | 0.025 |
| $CaCl_2 \cdot 2H_2O$ | 0.025 |
| $MgSO_4 \cdot 7H_2O$ | 0.025 |
| KCl | 0.025 |
| $MnSO_4$ | 0.006 |

These components were dissolved in deionized water and the pH of the resulting solution was adjusted to 5.0. The solution thus prepared was used as a basal medium.

A–2. Test method—To the basal medium was added 4'-O-(β-D-glucopyranosyl)-D-pantothenic acid in the amount given in Table 1, and then the medium was sterilized at 120° C. for 5 minutes. The surface of the medium was then covered with liquid paraffine. WNB–75 strain was inoculated on the medium and incubated at 30° C. for 4 days. The number of the cells grown was measured by a colony count on agar plate with the lapse of time. The WNB–75 strain is a known strain belonging to lactobacillaceae and described in "Agr. Biol. Chem.," Vol. 27, No. 8, pages 590–595 (1963). The results are given in Table 1. For comparison, calcium D-pantothenate was added to the same basal medium as above and the strain was cultured in the same manner as above. The results are also set forth in Table 1.

A-3. Results.—

TABLE 1

| Compound tested | Amount added (μg./ml.) | Incubation time (hr.) at 30° C. | | | | |
|---|---|---|---|---|---|---|
| | | 0 | 24 | 48 | 72 | 96 |
| | | Number of cells (cells/ml.) | | | | |
| Control | 0 | 10 | 7 | 8 | 10 | 3 |
| Present compound | 0.05 | 10 | $5\times10^3$ | $3\times10^5$ | $1.4\times10^7$ | $4\times10^8$ |
| | 0.1 | 10 | $7\times10^2$ | $4\times10^5$ | $6\times10^7$ | $5.6\times10^8$ |
| Calcium D-pantothenate | 0.5 | 10 | $2\times10^2$ | $8\times10^2$ | $1.5\times10^3$ | $6\times10^2$ |
| | 5.0 | 10 | $1.3\times10^2$ | $2\times10^4$ | $9\times10^6$ | $3\times10^8$ |

The test results show that 4'-O-(β-D-glucopyranosyl)-D-pantothenic acid is capable of effecting growth of WNB–75 strain in a concentration of 1/100 that of calcium D-pantothenate. In other words, the former has an activity 100 times that of the latter.

Test B.—Activities of the other compounds of this invention on WNB–75 strain

B-1. Test method.—Each of several compounds of this invention listed below was added to the same basal medium as used for Test A and WNB–75 strain was cultured in the same manner as in Test A to determine the physiological activities of the present compounds relative to those of calcium D-pantothenate. The physiological activities of the test compounds were expressed in terms of relative activities comparing with the activity of calcium D-pantothenate which is defined as one unit.

The results are given in Table 2.

B-2. Results.—

TABLE 2

| Compound tested: | Activity (unit/D–PaA) |
|---|---|
| Calcium D-pantothenate | 1 |
| 2'-O-(β-D-glucopyranosyl)-D-pantothenic acid | 5 |
| 2'-O-(β-cellobiosyl)-D-pantothenic acid | 20 |
| 4'-O-(β-D-galactopyranosyl)-D-pantothenic acid | 5 |
| 4'-O-(β-D-cellobiosyl)-D-pantothenic acid | 20 |

Test C.—Physiological activities on *Leuconostoc citrovorum* ML–34 strain

C-1. Test method.—To the same basal medium as used in Test A was added 4'-O-(β - D - glucopyranosyl) - D-pantothenic acid in the amount listed in Table 3, and *Leuconostoc citrovorum* ML–34 strain was cultured in the same manner as in Test A to determine the number of grown cells. The results are given in Table 3, which for comparison, further includes test results obtained in the same manner as above by using calcium D-pantothenate. The above-mentioned *Leuconostoc citrovorum* is a known strain belonging to lactobacillaceae and disclosed in "Am. J. Enol. Viticult.," vol. 11, 1–4 (1960) by J. L. Ingraham, R. H. Vaughn and G. M. Cooke and vol. 11, 59–63 (1960), by R. B. Webb and J. L. Ingraham.

C-2. Results.—

TABLE 3

| Compound tested | Amount added (μg./ml.) | Incubation time (hr.) at 30° C. | | | | |
|---|---|---|---|---|---|---|
| | | 0 | 24 | 48 | 72 | 96 |
| | | Number of cells (cells/ml.) | | | | |
| Control | 0 | 10 | 15 | 7 | 11 | 6 |
| Present compound | 0.05 | 10 | $9\times10$ | $5\times10^3$ | $1.8\times10^5$ | $7\times10^7$ |
| | 0.1 | 10 | $4\times10^2$ | $1\times10^5$ | $5\times10^7$ | $6\times10^8$ |
| Calcium D-pantothenate | 0.5 | 10 | $3\times10$ | $8\times10^2$ | $1.1\times10^3$ | $2\times10^3$ |
| | 5.0 | 10 | $5\times10^2$ | $1.7\times10^4$ | $2\times10^7$ | $4\times10^8$ |

(II) PHYSIOLOGICAL ACTIVITIES ON RAT

Test method

A powdery assorted feed "CA–1" (trademark, product of Japan Clea Co.) containing 80 mg./kg. of calcium D-pantothenate was fortified with 1 mg. and 5 mg. of 4'-O-(β-D-glucopyranosyl)-D-pantothenic acid per kilogram of the feed. Another two kinds of feed were prepared for comparison by further fortifying the same feed ("CA–1") with 50 mg. and 100 mg. of calcium D-pantothenate per kilogram of the same. Each of the feeds thus prepared was fed to 10 male, three-week old SD-JCL rats. The rats were free to take the feed and water, and the weight of the rats was measured every day.

The average weight of the 10 rats in each group is given in Table 4.

TABLE 4

| Compound tested | Amount added (mg./kg. diet) | Days elapsed after initiation of experiment | | | | Percent relative to control |
|---|---|---|---|---|---|---|
| | | 0 | 10 | 20 | 30 | |
| Control | | 48 | 106 | 194 | 292 | 100 |
| Present compound | 1 | 48.5 | 126.5 | 221.5 | 328 | 112.33 |
| | 5 | 48.75 | 119.25 | 214.5 | 321.5 | 110.10 |
| Calcium D-pantothenate | 50 | 47.5 | 111.5 | 199.5 | 292.5 | 100.17 |
| | 100 | 47.5 | 118 | 215.25 | 320.75 | 109.85 |

The results of the experiment show that the weight increase, for instance, in the case of 1 mg./kg. diet of the present compound was 36 g. greater (i.e. increase of 12.3%) on average than the control. This exceeds the result achieved with a lot fortified by calcium D-pantothenate, and shows that the present compound can be substituted for calcium D-pantothenate in a smaller amount than is the case with calcium D-pantothenate. The condition of the whole lot was normal and healthy.

The present compounds can be prepared by various methods. According to one of the preferred methods for preparing the compound represented by the Formula I–A before, alkyl 4'-O-acyl-D-pantothenate represented by the Formula II below, for example, is reacted with a halide of acyl sugar to produce an intermediate, alkyl 4'-O-acyl-2'-O-(O-acyl-β-glycosyl)-D - pantothenate represented by the Formula III below (hereinafter referred to as "intermediate $A^1$"), and the intermediate $A^1$ thus obtained is then subjected to deacylation and dealkylation reaction to produce the desired 2'-O-(β-glycosyl) - D - panthothenic acid acid (I–A). This method is hereinafter referred to as "Method A" and the reactions involved therein are shown by the following reaction equations:

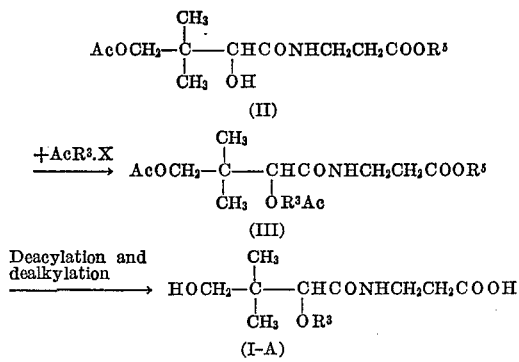

wherein $R^3$ is the same as defined before, Ac is acyl group such as acetyl or benzoyl, X is a halogen atom and $R^5$ is an alkyl group of 1 to 4 carbon atoms.

In the above Method A the alkyl 4'-O-acyl-D-pantothenate (II) used as a starting material is known in the art and easily prepared by thermal condensation of 2-O-benzyl-D-pantolactone and β-alanine alkyl ester, acylation of hydroxyl group at C–4' of the resultant condensation product and then debenzylation with catalytic hydrogenation. The above alkyl esters of acyl pantothenic acid (II) include methyl, ethyl, propyl, isopropyl and butyl esters, the preferable being ethyl ester. The halides of acyl sugars used include chlorides or bromides of acyl derivatives of D-ribofuranose, D-glucopyranose, D-galactopyranose, D-cellobiose or D-maltose.

The reaction of the alkyl esters of acyl pantothenic acid (II) with halide of acyl sugar in the first step can be conducted in the solvent such as nitromethane, benzene, toluene, chloroform, etc. The halide of acyl sugar is used in a stoichiometric amount or in an excess amount, preferably in an amount 10 to 50% in excess. The solvent may be used singly or in admixture with one another. The amount of the solvent used is in the range of 10 to 50 times the weight of the starting esters (II). To neutralize the hydrogen halide formed, an acid acceptor may be added to the reaction system, if desired. Examples of the acid acceptors are $Hg(CN)_2$, $Ag_2CO_3$, AgO, $AgClO_3$, $AgBF_4$, etc., the preferable being $Hg(CN)_2$. The amount of the acid acceptor used may vary over a wide range but usually it is employed in an amount ranging from an equimolar amount to a greatly excessive amount based on the mole of the halide of acyl sugar. Preferable reaction temperature is in the range of 80 to 110° C., though the reaction proceeds at a lower temperature with a retarded rate and at a higher temperature with undesired side reaction. To the reaction system there may be added as a reaction promotor dehydrating agents such as $CaSO_4$, etc., if desired. The promotor is used in an amount of 1 to 10 times the weight of the starting ester (II). It is preferable to carry out the reaction in an atmosphere free of water vapor, for example, in dried air or inert gas atmosphere. In general the reaction completes within about 5 to 20 hours, whereby the intermediate $A^1$, alkyl 4'-O-acyl-2'-O-(O-acyl-β-glycosyl)-D-pantothenate (III) can be obtained. The intermediate $A^1$ can be isolated, as required, from the resultant reaction mixture, for example, by filtrating the reaction mixture, concentrating the filtrate under reduced pressure, dissolving the concentrated mixture in benzene or other nonpolar solvents, washing the benzene solution with aqueous alkali metal halide solution and then with water, concentrating the washed mixture and subjecting the concentrated mixture to silica gel column chromatography using a 1:1 volume ratio mixture of benzene and ethyl acetate.

The intermediate $A^1$ can be subjected to subsequent deacylation and dealkylation reaction as it is in the reaction mixture resulting from the first-step reaction or after it is isolated. The second-step reaction, i.e., deacylation and dealkylation reaction of the intermediate $A^1$ (III) thus obtained is conducted in an organic solvent such as methanol, ethanol or like lower aliphatic alcohol in the presence of a catalyst. The solvent may be employed in an amount of 5 to 10 times the weight of the intermediate $A^1$. Examples of the catalysts are $Ba(OCH_3)_2$, $NaOCH_3$, $NH_3$, $Ba(OH)_2$, etc. and they can be used in an amount of a little molar excess, preferably one tenth excess of the intermediate $A^1$. It is preferable to carry out the reaction at a temperature of 0 to 30° C., as undesired side reaction is promoted at a higher temperature. The reaction can be conducted in an atmosphere free of water vapor such as in dried air or an inert gas atmosphere. The reaction usually completes within 1 to 24 hours in accordance with the reaction conductions applied, whereby the desired 2'-O-(β-glycosyl)-D-pantothenic acid (I–A) is obtained. The desired product (I–A) thus obtained can be isolated, for example, by adding water to the resultant reaction mixture, passing the mixture through a column of OH-form anion exchange resin, such as "Dowex 1 x 8" (trademark, the Dow Chemical Co., U.S.A.), washing the ion-exchanged substance with water, eluting the substance with an eluent, such as acetic acid, and freeze-drying the solution to produce the desired product (I–A) in the form of a white hygroscopic powder.

Another type of the product, 4'-O-(β-glycosyl)-D-pantothenic acid of the invention represented by the formula of I–B can also be prepared by various methods. According to one of the preferred methods benzyl 2'-O-benzyl-D-pantothenate having the Formula IV below is first reacted with halide of acyl sugar to produce benzyl 2'-O-benzyl - 4' - O-(O-acyl-β-glycosyl)-D-pantothenate having the Formula V below (hereinafter referred to as intermediate $B^1$). The intermediate $B^1$ (V) is then hydrogenated in the presence of catalyst to produce 4'-O-(O-acyl-β-glycosyl)-D-pantothenic acid having the formula of (VI) (hereinafter referred to as "intermediate $B^2$") and the intermediate $B^2$ (VI) thus obtained is finally subjected to deacylation reaction, whereby the desired 4'-O-(β-glycosyl)-D-pantothenic acid having the Formula I–B can be obtained. The above method is hereinafter referred to as "Method 1B" and reactions involved therein are shown by the following equations:

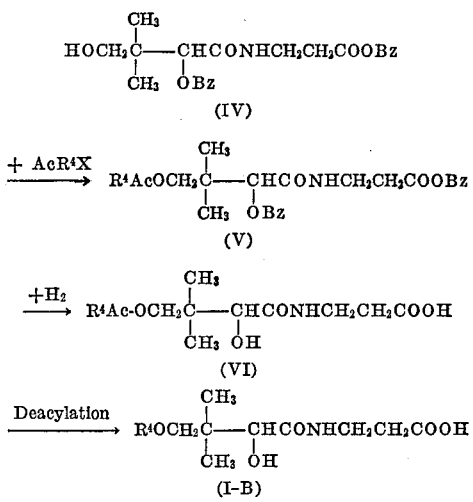

wherein Bz shows benzyl group and $R^4$, Ac and X are the same as defined before.

In the above Method 1B the benzyl 2'-O-benzyl-D-pantothenate (IV) used as a starting material is known in the art and can be prepared, for example, by the thermal condensation of 2-O-benzyl-D-pantolactone and β-alanine benzyl ester. The halides of acyl sugars used are the same as in the Method A before.

In the Method 1B the reaction between benzyl 2'-O-benzyl-D-pantothenate (IV) and halide of acyl sugar can be conducted under the same conditions as those disclosed in the first step of the Method A. The intermediate B¹ (V) obtained in this step can be isolated from the resultant reaction mixture, for example, by filtrating the reaction mixture, concentrating the filtrate, dissolving the concentrated liquid in benzene, washing the solution with aqueous potassium halide solution and then with saturated sodium hydrogen carbonate solution and further with water, concentrating the washed liquid under reduced pressure and finally subjecting the concentrated liquid to silica gel column chromatography using chloroform containing 2.5 vol. percent of ethanol.

In the second step the intermediate B¹ (V) is dissolved in an organic solvent and the solution is stirred in the presence of a catalyst in a hydrogen gas atmosphere for reduction reaction. The solvents used include acetic acid, methanol, ethanol, etc. These solvents can be employed alone or in admixture with one another in an amount of 2 to 10 times the weight of the intermediate B¹. In the above reaction conventional reduction catalysts such as palladium black, palladium charcoal, platinium oxide etc. can be used in an amount of 1 to 100 weight percent, based on the weight of the intermediate B¹. Preferably the reaction be carried out at room temperature in a hydrogen atmosphere, though elevated temperatures and/or increased pressures may also be applicable. The reaction usually completes within 5 to 10 hours, whereby the intermediate B² having the Formula VI can be obtained. The intermediate B² (VI) thus obtained can be isolated from the resultant reaction mixture, for example, by subjecting the reaction mixture to silica gel column chromatography using a 95:4:1 volume ratio mixture of $CHCl_3$, $CH_3OH$ and $CH_3COOH$ or a 95:5 volume ratio mixture of $CHCl_3$ and $C_2H_5OH$ and then recrystallizing the resultant substance from ether.

In the third step the intermediate B² is deacylated to produce the desired Compound I–B. The deacylated conditions are the same as those disclosed in deacylation and dealkylation conditions in the second step of the Method A before.

The 4'-O-(β-glycosyl)-D-pantothenic acid (I–B) thus obtained can be isolated from the reaction mixture in the same manner as in the case of the Compound I–A obtained by the Method A before.

According to another preferred method for preparing 4'-O-(β-glycosyl)-D-pantothenic acid (I–B) of the invention alkyl D-pantothenate having the Formula VII below is first reacted with halide of acyl sugar to produce alkyl 4'-O-(O-acyl-β-glycosyl)-D-pantothenate having the Formula VIII below and the resultant alkyl 4'-O-(O-acyl-β-glycosyl)-D-pantothenate (VIII) is then subjected to deacylation and dealkylation reaction, whereby the desired 4'-O-(β-glycosyl)-D-pantothenic acid (I–B) is obtained. This method is hereinafter referred to as "Method 2B" and reactions involved therein are shown by the following equations:

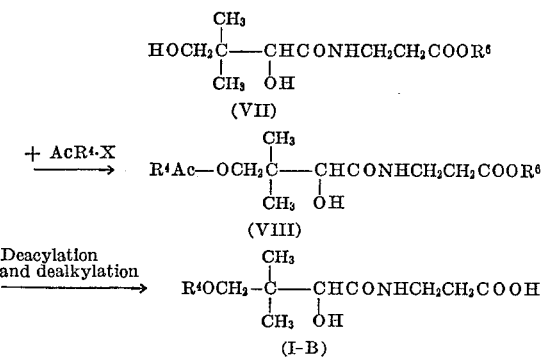

wherein R⁴, Ac and X are the same as defined before and R⁶ is an alkyl of 1 to 4 carbon atoms.

In the above Method 2B the alkyl D-pantothenate includes methyl, ethyl, propyl, isopropyl or butyl ester of D-pantothenic acid, and the halides of acyl sugars used include chlorides and bromides of acyl derivatives of D-ribofuranose, D-glucopyranose, D-galactopyranose, D-cellobiose and D-maltose.

The reaction conditions to be applied in the first step reaction of between alkyl D-pantothenate (VII) and halide of acyl sugar are the same as disclosed relating to the reaction of between alkyl 4'-O-acyl-D-pantothenate (II) and halide of acyl sugar in the Method A before. The resultant alkyl 4'-O-(O-acyl-β-glycosyl)-D-pantothenate (VIII) can be isolated in the same manner as in the isolation of the intermediate A¹ resulting from the first step of the Method A.

The subsequent deacylation and dealkylation of the alkyl 4'-O-(O-acyl - β - glycosyl)-D-pantothenate can be carried out in the same manner as in the deacylation and dealkylation of the intermediate A¹ in the Method A before, whereby the desired 4'-O-(β-glycosyl)-D-pantothenic acid (I–B) can be obtained. 4' - O - (β - glycosyl)-D-pantothenic acid can be isolated in the same manner as disclosed before.

For better understanding of the invention examples are given below.

EXAMPLE 1

2.9 g. of ethyl 4'-O-aceyl-D-pantothenate was dissolved in 20 ml. of 2:1 volume ratio dried mixture of nitromethane and benzene. To the resultant solution were added 3.8 g. of dried $Hg(CN)_2$ and 7.0 g. of activated $CaSO_4$ in the form of powder and the resultant mixture was stirred at room temperature for 1 hour. To the mixture was further added 7.0 g. of tetra-O-acetyl-α-D-glucopyranosyl bromide and the mixture was heated at 80 to 100° C. for 20 hours.

After being cooled, the resultant reaction mixture was filtered and the filtrate was concentrated under reduced pressure. The concentrated liquid was dissolved in benzene to produce 100 ml. of benzene solution and the solution was washed with aqueous potassium bromide solution and then with water. The washed liquid was evaporated to dryness under reduced pressure and thereafter subjected twice to silica gel column chromatography using a 1:1 volume ratio mixture of benzene and ethyl acetate, whereby 2.6 g. of ethyl 4'-O-acetyl-2'-O-(O-acetyl-β-D-glucopyranosyl)-D-pantothenate. Yield was 42%.

The N.M.R. (nuclear magnetic resonance) in $CDCl_3$ on the resultant product gave the following results.

N.M.R. spectrum (δ, p.p.m.):

0.92 (3H, s), 1.02 (3H, s), 1.30 (3H, t, J=7 c.p.s.), 2.0–2.1 (5 x Me), 2.53 (2H, t, J=7 c.p.s.), 3.5–5.3 (m), 6.93 (1H, t).

1.3 g. of ethyl 4'-O-acetyl-2'-O-(O-acetyl-β-D-glucopyranosyl)-D-pantothenate thus obtained was dissolved in 30 ml. of dried methanol. To the solution was added 10 ml. of 0.4 N $Ba(OCH_3)_2$ solution dissolved in methanol while being cooled with ice water and the resultant mixture was left to stand at 0° C. for 24 hours. To the resultant reaction mixture was added 20 ml. of water and the mixture was passed through a column of "Dowex 1 x 8" (trademark, ion exchange resin of The Dow Chemical Co., U.S.A., used as OH form). After being washed with water the product was eluted with 0.5 N acetic acid and freeze-dried to produce 0.77 g. of 2'-O-(β-D-glucopyranosyl)-D-pantothenic acid in the form of white hygroscopic powder. Yield was 95%.

The N.M.R. spectrum on the resultant product in $D_2O$ and elementary analysis thereof gave the following results.

N.M.R. spectrum (δ, p.p.m.):

0.88 (6H, s), 2.58 (2H, t, J=7 c.p.s.), 3.1–3.8 (m), 3.87 (1H, s), 4.38 (1H, d, J=6 c.p.s.).

Elementary analysis (percent): Found: C, 47.29; H, 7.06; 3.61. Calcd. for $C_{15}H_{27}O_{10}N$: C, 47.24; H, 7.14; N, 3.67.

EXAMPLE 2

To 30 ml. of benzene were added 2.9 g. of ethyl 4'-O-acetyl - D - pantothenate and 3.8 g. of dried Hg. $(CN)_2$ and the mixture was heated with stirring to evaporate off 20 ml. of benzene. Thereafter, 20 ml. of dried benzene was further added to the mixture and after the benzene was evaporated off with water as azeotropic mixture, 20 ml. of dried nitromethane was further added thereto. To the resultant mixture was added 7.0 g. of O-acetyl - α - D-glucopyranosyl bromide and the mixture was refluxed with stirring for 20 hours. The resultant reaction mixture was subjected to the same purification steps as in Example 1, whereby 1.3 g. of ethyl 4' - O-acetyl-2'-O-(O-acetyl-β-D-glucopyranosyl)-D-pantothenate was obtained. Yield was 21%.

The N.M.R. on the resultant product gave the same results shown as in Example 1.

From the resultant product was hydrolyzed and isolated by the same procedure as in Example 1, and 2'-O-(β - D - glucopyranosyl) - D - pantothenic acid was obtained. The N.M.R. on the product gave the same results as in Example 1.

EXAMPLE 3

To 30 ml. of a 2:1 volume ratio dried mixture of nitromethane and benzene were added with stirring 2.9 g. of ethyl 4'-O-acetyl-D-pantothenate, 3.8 g. of Hg. $(CN)_2$ and 7.0 g. of O-acetyl-α-D-glucopyranosyl bromide. The resultant mixture was refluxed with stirring for 24 hours. The resultant reaction mixture was subjected to the same purification steps as in Example 1, whereby 0.19 g. of ethyl 4'-O-acetyl - 2' - O-(O-acetyl-β-D-glucopyranosyl)-D-pantothenate was obtained.

The N.M.R. on the resultant product gave the same results shown in Example 1.

The resultant product was hydrolyzed and isolated in the same manner as in Example 1, whereby 2'-O-(β-D-glucopyranosyl)-D-pantothenic acid was obtained. The N.M.R. on the product gave the same results as in Example 1.

EXAMPLE 4

Ethyl 4' - O - acetyl - 2' - O - (O-acetyl-β-cellobiosyl)-D-pantothenate was prepared and isolated in the same manner as in Example 1 except that 4.9 g. of ethyl 4'-O-acetyl-D-pantothenate, 4.3 g. of Hg. $(CN)_2$ and 12 g. of hepta-O-acetyl-α-cellobiosyl bromide were used. Yield was 38%.

The N.M.R. in $CDCl_3$ on the resultant product gave the following results.

N.M.R. spectrum (δ, p.p.m.):

0.89 (3H, s), 0.97 (3H, s), 1.26 (3H, t, J=7 c.p.s.), 2.0–2.2 (7 x $CH_2$), 2.55 (2H, t, J=7 c.p.s.), 3.5–5.3 (m), 6.8 (1H, t).

0.4 g. of ethyl 4'-O-acetyl-2'-O-(O-acetyl-β-cellobiosyl)-D-pantothenate thus obtained was dissolved in 15 ml. of dried methanol. To the solution was added 0.5 ml. of 0.4 N $Ba(OCH_3)_2$ solution dissolved in methanol while being cooled with ice water and the resultant mixture was left to stand at 0° C. for 24 hours. The resultant reaction mixture was treated in the same manner as in Example 1, whereby 0.23 g. of 2'-O-(β-cellobiosyl)-D-pantothenic acid was obtained. Yield was 95%.

The N.M.R. in $D_2O$ on the resultant product gave the following results.

N.M.R. spectrum (δ p.p.m.):

0.88 (6H, s), 2.59 (2H, t, J=7 c.p.s.), 3.20–4.00 (m), 4.35–4.54 (2H, m).

EXAMPLE 5

6.0 g. of benzyl 2'-O-benzyl-D-pantothenate was dissolved in 50 ml. of a 2:1 volume ratio dried mixture of nitromethane and benzene. To the solution were added 5.1 g. of dried $Hg(CN)_2$ and 10 g. of activated $CaSO_4$ in the form of powder and the mixture was stirred at room temperature for 1 hour. To the mixture was further added 8.2 g. of tetra-O-acetyl-α-D-glucopyranosyl bromide and the mixture was refluxed for 10 hours.

After being cooled, the resultant reaction mixture was filtered and the residue was washed with benzene. The washed liquid was mixed with the filtrate and the mixture was concentrated under reduced pressure. The concentrated liquid was dissolved in benzene to produce 100 ml. of benzene solution and the solution was washed with aqueous potassium bromide solution and then with saturated sodium hydrogen carbonate solution and finally with water. The washed liquid was dried with $K_2CO_3$ and concentrated under reduced pressure, whereby oily substance, yellowish brown in color, was obtained. The oily substance was then subjected to silica gel column chromatography to produce 6.0 g. of benzyl 2'-O-benzyl-4'-O-(O-acetyl - β - D - glucopyranosyl) - D - pantothenate. Yield was 40%.

The N.M.R. in $CDCl_3$ on the resultant product gave the following results.

N.M.R. spectrum (δ, p.p.m.):

0.87 (3H, s), 0.94 (3H, s), 1.98 (4 x $CH_3$), 2.53 (2H, t, J=6 c.p.s.), 3.1–4.7 (m), 5.05 (2H, s), 7.25 (10 H).

6.0 g. of benzyl 2'-O-benzyl-4'-O-(O-acetyl-β-D-glucopyranosyl)-D-pantothenate was dissolved in 30 ml. of acetic acid and then 1.0 g. of palladium black was added to the solution. The resultant mixture was violently stirred in a hydrogen gas atmosphere at room temperature for 8 hours for catalytic reduction. After being filtered and concentrated the resultant reaction mixture was subjected to silica gel column chromatography using a 95:4:1 volume ratio mixture of $CHCl_3$, $CH_3OH$ and $CH_3COOH$ or a 95:5 volume ratio mixture of $CHCl_3$ and $C_2H_5OH$, and thereafter recrystallized from ether, whereby 2.3 g. of 4'-O-(tetra-O-acetyl-β-D-glucopyranosyl)-D-pantothenic acid was obtained. Yield was 85%.

The N.M.R. in $CDCl_3$ on the resultant product gave the following results.

N.M.R. spectrum (δ, p.p.m.):

0.91 (3H, s), 0.97 (3H, s), 2.0–2.1 (4 x $CH_3$), 2.6 (2H, t, J=6 c.p.s.), 3.1–5.3 (m), 7.00 (1H, m).

2.3 g. of 4'-O-(tetra-O-acetyl-β-D-glucopyranosyl)-D-pantothenic acid was dissolved in 30 ml. of dried methanol. To the solution was added 15 ml. of 0.4 N $Ba(OCH_3)_2$ solution dissolved in methanol while being cooled with ice water and the resultant mixture was left to stand at 0° C. for 24 hours. To the resultant reaction mixture was added 20 ml. of water and the mixture was passed through a column of "Dowex 1 x 8" (trademark, the same as in Example 1). After being washed with water the product was eluted with 0.5 N acetic acid and freeze-dried to obtain 1.5 g. of 4'-O-(β-D-glucopyranosyl)-D-pantothenic acid as a white hygroscopic powder. Yield was 94%.

The N.M.R. in $D_2O$ on the resultant product and elementary analysis thereof gave the following results.

N.M.R. spectrum (δ, p.p.m.):

0.88 (3H, s), 0.94 (3H, s), 2.58 (2H, t, J=6 c.p.s.), 3.2–3.9 (m), 4.03 (1H, s), 4.37 (1H, d, J=6 c.p.s.).

Elementary analysis (percent): Found: C, 47.29; H, 7.12; N, 3.80. Calcd. for $C_{15}H_{27}O_{10}N$: C, 47.24; H, 7.14; N, 3.67.

EXAMPLE 6

Benzyl 2' - O - benzyl - 4'-O-(O-acetyl-β-cellobiosyl)-D-pantothenate was prepared and isolated in the same manner as in Example 5 except that 4.0 g. of benzyl 2'-O-benzyl-D-pantothenate, 2.6 g. of $Hg(CN)_2$ powder and 7.0 g. of hepta-O-acetyl-α-cellobiosyl bromide were used. Yield was 40%.

The N.M.R. in CDCl$_3$ on the resultant product gave the following results.

N.M.R. spectrum (δ, p.p.m.):

0.85 (3H, s), 0.94 (3H, s), 2.02 (7 x CH$_3$), 2.53 (2H, t, J=6 c.p.s.), 3.1–5.2 (m), 7.27 (10 H).

1.5 g. of benzyl 2'-O-benzyl-4'-O-(O-acetyl-β-cellobiosyl)-D-pantothenate was dissolved in 10 ml. of ethanol and to the solution was added 0.3 g. of palladium black. The mixture was subjected to catalytic reduction in the same manner as in Example 5 to produce 0.7 g. of 4'-O-(O - acetyl - β - cellobiosyl)-D-pantothenic acid having a melting point of 100 to 115° C. Yield was 85%.

The N.M.R. in CDCl$_3$ on the resultant product gave the following results.

N.M.R. spectrum (δ, p.p.m.):

0.91 (3H, s), 0.95 (3H, s), 2.03 (7 x CH$_3$) 2.57 (2H, m), 3.74 (s), 3.4–5.3 (m).

0.55 g. of 4'-O-(O-acetyl-β-cellobiosyl)-D-pantothenic acid was dissolved in 20 ml. of dried methanol. To the solution was added 2.5 ml. of 0.4 N Ba(OCH$_3$)$_2$ solution dissolved in methanol while being cooled with ice water and the resultant mixture was left to stand at 0° C. for 24 hours. The resultant reaction mixture was treated in the same manner as in Example 1, whereby 330 mg. of 4'-O-(β-cellobiosyl)-D-pantothenic acid was obtained. Yield was 93%.

The N.M.R. in D$_2$O on the resultant product and elementary analysis thereof gave the following results.

N.M.R. spectrum (δ, p.p.m.):

0.89 (3H, s), 0.92 (3H, s), 2.58 (2H, t, J=6 c.p.s.), 3.2–3.9, m), 4.02 (1H, s), 4.36 (1H, d, J=6 c.p.s.), 4.48 (1H, d, J=6 c.p.s.).

Elementary analysis (percent): Found: C, 46.60; H, 7.00; N, 2.57. Calcd. for C$_{21}$H$_{37}$O$_{15}$N·C$_2$H$_5$OH (percent): C, 46.85; H, 7.35; N, 2.38.

EXAMPLE 7

4.0 g. of benzyl 2'-O-benzyl-D-pantothenate, 2.8 g. of Hg(CN)$_2$ and 10 g. of CaSO$_4$ were added to 40 ml. of a 3:1 volume ratio mixture of nitromethane and benzene, and the mixture was stirred at room temperature for 2 hours. To the resultant solution was added 4.8 g. of tri-O-benzoyl-D-ribofuranosyl chloride dissolved in 20 ml. of benzene and the resultant mixture was then slowly refluxed for 20 hours with stirring.

After being cooled, the resultant reaction mixture was filtered and the filtrate was concentrated under reduced pressure. The concentrated liquid was then dissolved in benzene and the benzene solution obtained was washed with 1 M of KBr and then with water and concentrated under reduced pressure. The concentrated product was subjected to silica gel column chromatography with 1% ethanol-containing CHCl$_3$ to obtain 8.7 g. of benzyl 2'-O-benzyl-4'-O-(tri-O-benzoyl-β - D - ribofuranosyl)-D-pantothenate, a somewhat impure condensation product.

The product was then subjected to catalytic reduction in 15 ml. of acetic acid in the presence of H$_2$ gas using 1 g. of palladium black as a catalyst. The resultant product was thereafter subjected to silica gel column chromatography with a 96:3:1 volume ratio mixture of CHCl$_3$, methanol and acetic acid. The resulting substance was subsequently recrystallized from ether-petroleum ether to obtain 5.2 g. of 4'-O-(tri-O-benzoyl-β-D-ribofuranosyl)-D-pantothenic acid. Yield was 78%.

The N.M.R. in CDCl$_3$ on the resultant product and elementary analysis thereof gave the following results.

N.M.R. spectrum (δ, p.p.m.):

0.99 (6H, s), 2.59, 3.58, 4.13, 4.67, 5.32, 5.73, 7.0–8.2.

Elementary analysis (percent): Found: C, 63.32; H, 5.69; N, 2.17. Calcd. for C$_{35}$H$_{37}$O$_{12}$N: C, 63.34; H, 5.62; N, 2.11.

3.2 g. of the product thus obtained was dissolved in 10 ml. of a 1:4 volume ratio mixture of CH$_2$Cl$_2$ and methanol and the solution was cooled to 0° C., whereupon 15 ml. of 0.5 N NaOCH$_3$ was added to the solution. The mixture was then left standing at room temperature for 30 hours. After neutralization and subsequent concentration under reduced pressure, the resultant product was made into 30 ml. of an aqueous solution, from which benzoic acid was removed by extraction with ether. The product was then applied to a "Dowex 1 x 8" (trademark, the same as in Example 1) column and then washed with water, this being followed by elution with 0.5 N acetic acid and freeze-drying to give 1.6 g. of oily 4'-O-(β-D-ribofuranosyl) - D - pantothenic acid. Yield was 94%.

The N.M.R. in D$_2$O on the product and elementary analysis thereof gave the following results.

N.M.R. spectrum (δ, p.p.m.):

0.94, 0.99, 1.02, 2.58 (2H, t, J=7 c.p.s.), 3.25–3.95 (m), 4.02 (s), 4.05–4.32 (m), 4.97.

Elementary analysis (percent): Found: C, 47.29; H, 7.28; N, 3.88. Calcd. for C$_{14}$H$_{25}$O$_9$N: C, 47.86; H, 7.17; N, 3.99.

EXAMPLE 8

In the same manner as in Example 5, benzyl 2'-O-benzyl-4'-O-(O - acetyl - β - D - galactopyranosyl)-D-pantothenate was prepared, which was subjected to silica gel column chromatography with a 6:4 volume ratio mixture of benzene and CH$_3$COOC$_2$H$_5$ to obtain 2.15 g. of a purified product by using 2.0 g. of benzyl 2'-O-benzyl-D-pantothenate, 1.9 g. of Hg(CN)$_2$ and 3.5 g. of tetra-O-acetyl-α-D-galactopyranosyl bromide. Yield was 59%.

2.15 g. of benzyl 2' - O - benzyl-4'-O-(O-acetyl-β-D-galactopyranosyl)-pantothenate thus prepared was dissolved in 5 ml. of acetic acid, and 0.2 g. of palladium black was added to the resulting solution. The solution was then subjected to catalytic reduction in the same manner as in Example 5 and subsequently purified by silica gel chromatography with 5% ethanol-containing CHCl$_3$ to obtain 1.5 g. of 4'-O-(O-acetyl-β-D-galactopyranosyl)-D-pantothenic acid. Yield was 93%.

1.5 g. of this product was dissolved in 30 ml. of dry methanol, and 10 ml. of 0.4 N Ba(OCH$_3$)$_2$ was added to the solution while the solution was kept at 0° C. The mixture was left to stand at 0° C. for 24 hours. The reaction solution was treated in the same manner as in Example 5 to obtain 850 mg. of 4'-O-(β-D-galactopyranosyl)-D-pantothenic acid. Yield was 82%.

The N.M.R. in D$_2$O on the resulting product and elementary analysis thereof gave the following results.

N.M.R. spectrum (δ, p.p.m.):

0.87 (3H, s), 0.93 (3H, s), 2.58 (2H, t, J=7 c.p.s.), 3.3–4.0 (m), 4.04 (1H, s), 4.32 (1H, d, J=7 c.p.s.).

Elementary analysis (percent): Found: C, 47.40; H, 7.17; N, 3.64. Calcd. for C$_{15}$H$_{27}$O$_{10}$N: C, 47.24; H, 7.14; N, 3.67.

EXAMPLE 9

In the same manner as in Example 5, benzyl 2'-O-benzyl-4'-O-(O-acetyl - β - maltosyl)-D-pantothenate was prepared, which was then purified by silica gel column chromatography with 2.5% ethanol-containing CHCl$_3$ to obtain 3.1 g. of a purified product, using 3.2 g. of benzyl 2'-O-benzyl-D-pantothenate, 2.1 g. of Hg(CN)$_2$ powder and 5.6 g. of hepta-O-acetyl-α-maltosyl bromide. Yield was 38%.

3.1 g. of the benzyl 2'-O-benzyl-4'-O-(O-acetyl-β-maltosyl)-D-pantothenate was dissolved in 7 ml. of acetic acid, and 0.2 g. of palladium black was added to the solution. In the same manner as in Example 5, the resulting solution was subjected to catalytic reduction and subsequently to silica gel column chromatography with a 95:4:1 volume ratio mixture of $CHCl_3$, $CH_3OH$ and $CH_3COOH$ to obtain 1.6 g. of 4'-O-(O-acetyl-β-maltosyl)-D-pantothenic acid. Yield was 63%.

1.2 g. of this product was dissolved in 50 ml. of dry methanol, and the solution was cooled to 0° C., whereupon 4 ml. of 0.5 N $NaOCH_3$ was added to the solution. The mixture was left to stand at room temperature for 3 hours. After addition of 20 ml. of $H_2O$, the reaction product was purified by a "Dowex 1 x 8" (trademark, the same as in Example 1) column in the same manner as in Example 5. The purified product was then subjected to freeze-drying to give 700 mg. of 4'-O-(β-maltosyl)-D-pantothenic acid. Yield was 89%.

The N.M.R. in $D_2O$ on the resulting product and elementary analysis thereof gave the following results.

N.M.R. spectrum (δ, p.p.m.):

0.89 (3H, s), 0.94 (3H, s), 2.58 (2H, h, J=7 c.p.s.), 3.2–4.0 (m), 4.01 (1H, s), 4.37 (1H, d, J=7 c.p.s.), 5.31 (1H, d, J=3 c.p.s.).

Elementary analysis (percent): Found: C, 46.48; H, 6.88; N, 2.54. Calcd. for $C_{21}H_{37}O_{15}N$: C, 46.40; H, 6.86; N, 2.58.

EXAMPLE 10

To 30 ml. of dried benzene were added 3.35 g. of methyl D-pantothenate and 4.0 g. of $Hg(CN)_2$. To the resultant mixture was added dropwise in 6 hours with stirring under reflux condition 10 g. of 2,3,4,6-tetra-O-benzoyl-α-D-glucopyranosyl bromide dissolved in 100 ml. of benzene. The reaction system was further refluxed with stirring for 2 hours.

After being cooled the resultant reaction mixture was filtered. The residue was washed with benzene and after the washing was mixed with the filtrate the mixture was subjected to concentration under reduced pressure. The concentrate was dissolved in 100 ml. of benzene and washed with aqueous potassium bromide solution, then with saturated sodium hydrogen carbonate solution and finally with water. The washed benzene solution was dried with potassium carbonate and concentrated under reduced pressure. The concentrate was subjected to silica gel column chromatography using chloroform containing 2.5 vol. percent of ethanol, whereby 4.0 g. of methyl 4'-O-(2,3,4,6-tetra-O-benzoyl-β-D-glucopyranosyl) - D - pantothenate was obtained.

The N.M.R. in $CDCl_3$ on the resultant product and elementary analysis thereof gave the following results.

N.M.R. spectrum (δ, p.p.m.):

0.85 (6H, s), 2.44 (2H, t, J=7 c.p.s.), 3.23–3.95 (m), 4.50–4.95 (m), 6.02–5.57 (m), 7.20–8.10 (20 H, m).

Elementary analysis (percent): Found: C, 64.96; H, 5.65; N, 1.77. Calcd. for $C_{44}H_{25}O_{14}N$: C, 65.09; H, 5.59; N, 1.73.

1.6 g. of methyl 4'-O-(2,3,4,6-tetra-O-benzoyl-β-D-glucopyranosyl)-D-pantothenate was dissolved in 5 ml. of dichloromethane, to which 15 ml. of dried methanol was further added. 6 ml. of 0.5 N $NaOCH_3$ was added to the solution and thereafter the solution was left to stand at 20° C. for 24 hours. After being cooled and neutralized with hydrochloric acid the resultant reaction mixture was passed through a column of "Dowex 1 x 8" (trademark, the same as in Example 1). After being washed with water the product was eluted with 0.5 N acetic acid and freeze-dried to produce 0.68 g. of 4'-O-(β-D-glucopyranosyl)-D-pantothenic acid in the form of white hygroscopic powder. Yield was 90%.

The N.M.R. spectrum on the resultant product in $D_2O$ and elementary analysis thereof gave the following results.

N.M.R. spectrum (δ, p.p.m.):

0.88 (3H, s), 0.94 (3H, s), 2.58 (2H, t, J=6 c.p.s.), 3.2–3.9 (m), 4.03 (1H, s), 4.37 (1H, d, J=6 c.p.s.).

Elementary analysis (percent): Found: C, 47.28; H, 7.11; N, 3.80. Calcd. for $C_{15}H_{27}O_{10}N$: C, 47.24; H, 7.14; N, 3.67.

EXAMPLE 11

To 50 ml. of dried benzene were added 7.0 g. of methyl D-pantothenate and 8.5 g. of $Hg(CN)_2$. To the resultant mixture was added dropwise in 10 hours with stirring under reflux condition 13.0 g. of 2,3,4,6-tetra-O-acetyl-α-D-glucopyranosyl bromide dissolved in 150 ml. of benzene, and the reaction system was further refluxed with stirring for 2 hours.

The resultant reaction mixture was treated in the same manner as in Example 10 and subjected to silica gel column chromatography using chloroform containing 4.0 vol. percent of ethanol, whereby 3.27 g. of methyl 4'-O-(2,3,4,6-tetra-O-acetyl-β-D-glucopyranosyl) - D - pantothenate was obtained.

N.M.R. in $CDCl_3$ on the resultant product and elementary analysis thereof gave the following results.

N.M.R. spectrum (δ, p.p.m.):

0.90 (3H, s), 0.98 (3H, s), 1.96–2.12 (4× $CH_3CO$), 2.55 (2H, t, J=6 c.p.s.), 3.20–5.20 (m), 3.68 (3H, s).

Elementary analysis (percent): Found C, 51.11; H, 6.67; N, 2.49. Calcd. for $C_{24}H_{37}O_{14}N$: C, 51.15; H, 6.62; N, 2.49.

200 mg. of methyl 4'-O-(2,3,4,6-tetra - O - acetyl-β-D-glucopyranosyl)-D-pantothenate was dissolved in 5 ml. of methanol. 1 ml. of 0.4 N $Ba(OCH_3)_2$ was added to the solution cooled with ice and thereafter the solution was left to stand at 0° C. for 24 hours.

After diluted with 10 ml. of water the resultant reaction mixture was treated in the same manner as in Example 10, whereby 127 mg. of 4'-O-(β-D-glucopyranosyl)-D-pentothenic acid was obtained.

N.M.R. in $CDCl_3$ on the resultant product and elementary analysis thereof gave the following results.

N.M.R. spectrum (δ, p.p.m.):

0.88 (3H, s), 0.94 3H, s), 2.58 (2H, t, J=6 c.p.s.), 3.2–3.9 (m), 4.03 (1H, s), 4.37 (1H, d, J=6 c.p.s.).

Elementary analysis (percent): Found: C, 47.27; H, 7.12; N, 3.78. Calcd. for $C_{15}H_{27}O_{10}N$: C, 47.24; H, 7.14; N, 3.67.

What we claim is:

1. A glycosyl pantothenic acid having a formula of

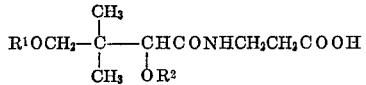

wherein one of $R^1$ and $R^2$ is hydrogen and the other is β-D-ribofuranosyl, β - D - glucopyranosyl, β-D-galactopyranosyl, β-cellobiosyl or β-maltosyl.

2. The glycosyl pantothenic acid according to claim 1, in which $R^1$ is hydrogen and $R^2$ is β-D-glucopyranosyl or β-cellobiosyl.

3. The glycosyl pantothenic acid according to claim 1, in which $R^1$ is β-D-ribofuranosyl, β-D-glucopyranosyl, β-D-galactopyranosyl, β-cellobiosyl or β-maltosyl, and $R^2$ is hydrogen.

4. The glycosyl pantothenic acid according to claim 3, in which said $R^1$ is β-D-glucopyranosyl.

References Cited

UNITED STATES PATENTS 3,356,674  12/1967  Ikeda et al. _____ 260—210 R
3,380,992  4/1968  Argoudelis et al. ___ 260—210 R JOHNNIE R. BROWN, Primary Examiner U.S. Cl. X.R.

195—31; 424—180, 361